Feb. 8, 1966  E. L. LUSTENADER  3,234,109
METHOD AND APPARATUS FOR FLASH DISTILLATION
Original Filed July 20, 1960  2 Sheets-Sheet 1

Inventor:
Edward L. Lustenader,
by Paul A. Frank
His Attorney.

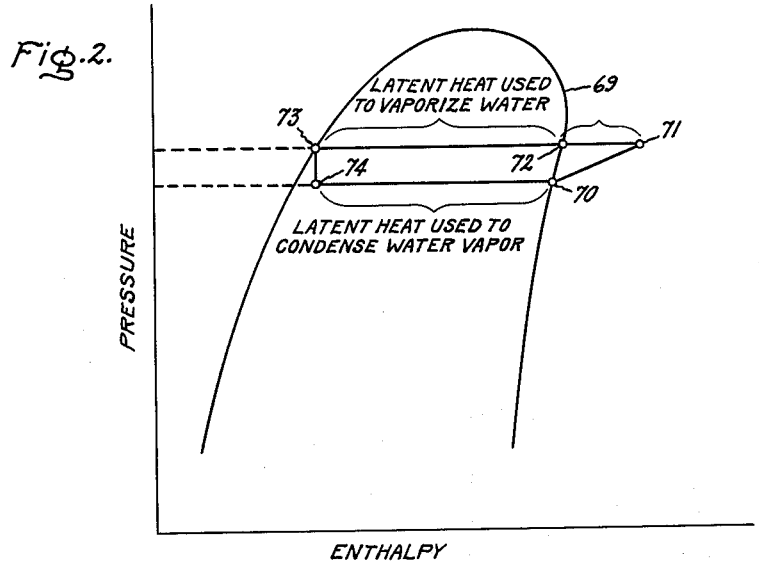
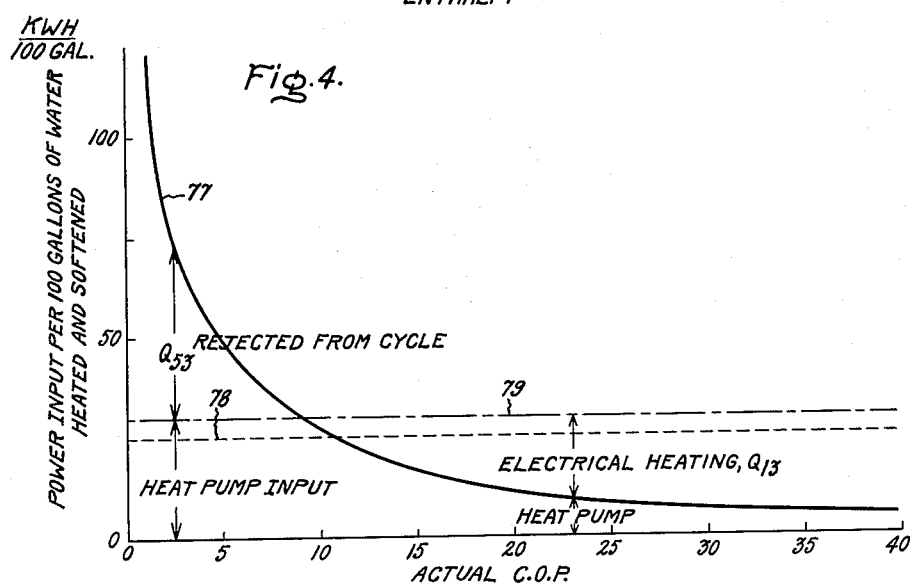
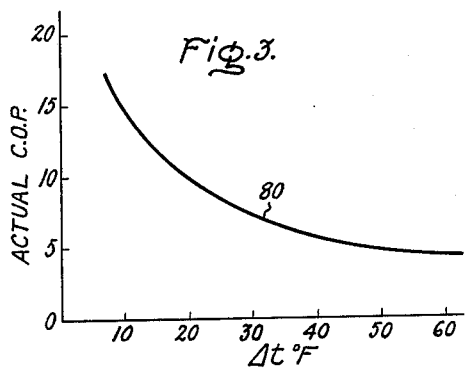

United States Patent Office 3,234,109
Patented Feb. 8, 1966

3,234,109
METHOD AND APPARATUS FOR FLASH DISTILLATION
Edward L. Lustenader, Scotia, N.Y., assignor to General Electric Company, a corporation of New York
Continuation of application Ser. No. 44,188, July 20, 1960. This application July 28, 1964, Ser. No. 387,818
5 Claims. (Cl. 203—11)

This application is a continuation of my copending application, Serial No. 44,188, filed July 20, 1960 and assigned to the same assignee as the present invention.

The present invention relates to a method and apparatus for distillation and, more particularly to a method and apparatus for distillation for use in appliance type water softeners.

There is presently a need for appliance type apparatus for demineralizing water. Many areas are located adjacent to "brackish" water supplies, the impurity content of the water rending it unusable. Other communities have "hard" water supplies. The mineral content in hard water may be lower and may take the form of such minerals as calcium carbonate and magnesium carbonate. Presently, there are commercially available devices known as water softeners which reduce the harsh character of hard water by utilizing chemical means to provide ion exchange in a manner to remove calcium and magnesium ions from the water. These chemical means have the disadvantage that they require frequent replacement of the chemicals and also in that they are selective in the type of ions which are replaced. Actually, these water softeners primarily are directed toward hard water wherein, it is intended to remove specific minerals which tend to reduce the effectiveness of cleaning agents.

Distillation apparatus generally are less feasible for domestic use because of the high energy imput required to operate such apparatus, and also because of scaling problems associated with the evaporating surface utilized in such apparatus.

The chief object of the present invention is to provide an improved distillation method and apparatus for appliance use.

A further object of the invention is to provide an improved distillation apparatus for domestic use which avoids common scaling problems in the evaporating portion thereof.

A still further object of the invention is to provide a method and apparatus for flash distillation utilizing a refrigeration circuit for heating distilland and for condensing distillate.

These and other objects of my invention will be more readily perceived from the following description.

Briefly stated, the present invention relates to a method and apparatus for flash distillation wherein distilland is heated by the condensing portion of a refrigeration circuit, passed into a low pressure chamber, a portion of the distilland is flash evaporated, the distillate vapor so formed being condensed by being placed into heat exchange relation with the evaporator portion of the refrigeration circuit.

The attached drawings illustrate a preferred embodiment of the invention in which:

FIGURE 2 is a diagram plotting pressure vs. enthalpy for a refrigeration cycle for use with the apparatus in FIGURE 1;

Figure 1:
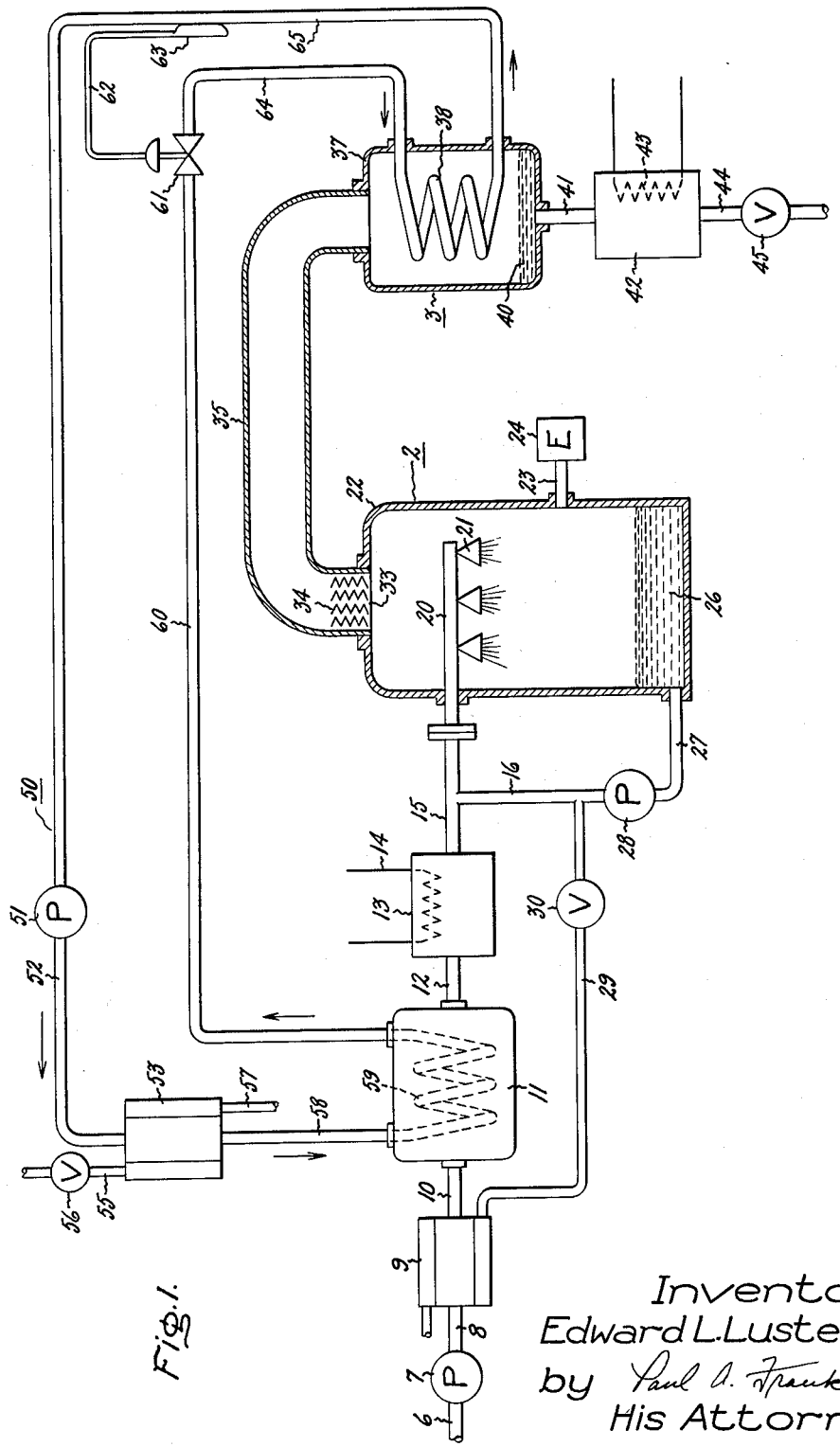
FIGURE 1 is a diagrammatic view of an apparatus for practicing the present invention.

FIGURE 3 is a diagram plotting actual coefficient of performance vs. temperature difference between the evaporating and condensing portions of refrigeration cycles for use with the present invention; and FIGURE 4 is a diagram plotting power input vs. actual coefficient of performance and indicating the relationship of coefficient of performance to supplemental cooling and heating requirements for the apparatus illustrated in FIGURE 1.

In FIGURE 1 an apparatus for practicing the present invention is shown which comprises an evaporating chamber 2 and a condensing chamber 3. Distilland to be supplied to the evaporating chamber 2 is passed through line 6 to pump 7, which passes the distilland to line 8 and heat exchanger 9, wherein the distilland is heated by being placed in heat exchange relation with concentrated distilland being discharged by the apparatus. Distilland passing from heat exchanger 9 passes through line 10, to heat exchanger 11, wherein the distilland is passed in heat exchange relation with condensing portion of refrigeration circuit 50, to be more fully described hereinafter. Distilland passes through line 12 through heat exchanger 13, having located therein supplemental heating means 14 supplied with a heat exchange medium from a source external to both the refrigeration circuit and distillation apparatus, which may be an electrical heater. The purpose of heat exchanger 13 will be more fully described hereinafter. Distilland leaving heat exchanger 13 passes through line 15 which is connected to line 16, through which is passed distilland being recirculated through evaporating chamber 2. Distilland being supplied to the apparatus and recirculated distilland from the evaporating chamber 2, are introduced to header 20, having suitable supply nozzle 21.

Evaporating chamber 2 comprises shell 22, which has extending therein header 20. It is desirable that the evaporation be performed in a suitable vacuum and for this purpose, evacuating means 24 may be connected to shell 22, by means of line 23. Evacuating means 24 may be any suitable purging device, as for example, a steam ejector or a vacuum pump.

As liquid is introduced into evaporating chamber 2, a substantial portion of the distilland is evaporated because of the elevated temperatures of the distilland and low pressure conditions in the chamber, the remaining distilland passing into sump 26 which comprises the lower portion of shell 22. Distilland in sump 26 is passed through line 27 and pump 28 into line 16 for recirculation through the evaporating chamber. In order to maintain the concentration of distilland in sump 26 at a desired level, a portion of the concentrated distilland may be discharged from the system through line 29. The heat of this distilland is utilized to heat the incoming distilland in heat exchanger 9. The amount of discharge from the system may be suitably controlled by valve 30 located in line 29.

Distillate vapor resulting from evaporating distilland passes upwardly through opening 33 in shell 22 and encounters eliminator construction 34 which removes entrapped liquid particles in the vapor stream. Eliminator constructions are well known in the art and may take the form of parallel corrugated sheets which provide a tortuous path for the fluids passing therethrough, the heavier liquid particles impinging on the corrugated surfaces to drain back into evaporating chamber 2. The vapor passes through conduit 35 and is discharged into condensing portion 3 which comprises shell 37, having located therein heat exchange surface 38, which form the evaporator section of refrigeration circuit 50. Vapor condensing on heat exchanger 38 flows into sump 40, located in lower portion of shell 37. The condensed distillate, when the distilland is saline or brackish water, comprises substantially pure distilled water. This distillate is passed through line 41 to storage means 42. In the case of a hot water heater having associated therewith a water softening device storage means 42 may have associated therewith heating means 43 such as an electrical heating element. The substantially demineralized water is discharged from storage means 42 through line 44 and valve 45 for use.

To heat and condense the distilland, a refrigeration system 50 is utilized in the present apparatus which includes compressor 51 which may be of the reciprocating type, hot gas line 52, auxiliary heat exchanger 53, the purpose of which is to be more fully described hereinafter, line 58, condenser section 59 which is associated with heat exchanger 11, liquid line 60, expansion means 61, line 64, evaporator section 38 and suction gas line 65 which is connected to compressor 51. The expansion means 61 may be of any suitable type, such as a thermal expansion valve which responds to the temperature of suction gas by means of capillary connection 62 to the temperature bulb 63 mounted on suction gas line 65.

In operation, distilland such as saline water, brackish or hard water, is introduced through line 6, pump 7, line 8, and heated in heat exchanger 9 by concentrated distilland being discharged from the apparatus. The heated distilland is further heated by being passed through heat exchanger 11 which places the distilland in heat exchanger relation with condensing refrigerant in condenser section 59 of refrigeration circuit 50. The distilland may be further heated in heat exchanger 13 by suitable means such as electrical heating means 14. The distilland passes through line 15 which is also connected to line 16. Line 16 recirculates distilland from evaporating chamber 2 and mixes such distilland with incoming distilland which is supplied to header 20. Distilland is sprayed through nozzles 21, a substantial portion of the distilland vaporizing, the remaining distilland following into sump 26 to be recirculated through line 27, pump 28, and line 16. Valve 30 in line 29 is provided to regulate the discharge from the system of an amount of concentrated distilland to maintain the distilland concentration in the sump below a desired level.

Evaporating chamber 2 is maintained evacuated by means of ejector 24 which is connected to shell 22 by line 23. Preferably, the temperature of the incoming distilland should be at a temperature higher than the saturated vapor temperature for the pressure in evacuating chamber 2. For example, it is desirable that entering distilland, such as brackish water, be at approximately 180° F. and the temperature at which the distilland evaporates in evaporating chamber 2 should be approximately 170° F. Therefore, as the heated distilland is introduced into evaporating chamber 2, because of the pressure conditions therein and also due to the temperature of the distilland, a substantial portion of the distilland turns to vapor. The vapor will tend to pass through opening 33, through conduit 35 to condensing chamber 3, being defined by shell 37, and having heat exchanger 38 therein. The vapor, as it tends to pass through opening 33 toward the cool surface of heat exchanger 38, will tend to carry therewith entrained distilland particles. Eliminator construction 34 supplies impinging surfaces adapted to remove such particles from the vapor stream. The vapor passing through conduit 35 condenses on the surface of heat exchanger 38, heat exchanger 38 being the evaporator section of refrigeration circuit 50. The condensed vapor falls into sump 40 of shell 37 from whence it is passed through line 41 to storage means 42. As previously noted when this apparatus is utilized as a combination water softener and hot water heater, auxiliary heating means such as electrical heater 43 may be utilized to maintain the temperature of the water in the storage means 42 at a desired level.

The incoming distilland is heated by the condenser portion of a refrigeration circuit and the distillate vapor is condensed by the evaporating section of the refrigeration circuit. Refrigeration circuit 50 includes a circuit wherein refrigerant gas is compressed in compressor 51 and passed through discharge line 52 to auxiliary heat exchanger 53. The gas at this point may be suitably cooled by being placed in heat exchanger relation with distilland or other cooling medium, such cooling medium being metered through line 55, by valve 56 and being discharged from heat exchanger 53 through line 57. The slightly cooled refrigerant vapor is then condensed in condensing section 59 of the refrigeration circuit and the heat of the refrigerant imparted to the distilland in heat exchanger 11. The condensed refrigerant vapor is passed through liquid line 60 to be expanded through thermal expansion valve 61. The mixture of vapor and liquid refrigerant is passed through line 64 to the evaporating section 38, wherein the refrigerant is subsequently vaporized and the latent heat of vaporization is utilized to condense distillate vapor in the condensing portion 3. The refrigerant gas is returned to compressor 51 through suction gas line 65. Bulb 63 is connected to the thermal expansion valve 61 through capillary 62 in a manner whereby the temperature of the suction gas controls the passage of refrigerant through valve 61.

FIGURE 2 is a diagram plotting pressure vs. enthalpy for refrigeration cycle. Refrigerant vapor such as monochlorodifluoromethane is compressed in compressor 51. This increase in pressure is shown occurring between points 70 and 71. The vapor may become superheated as shown in FIGURE 2. The vapor is condensed from point 71 through point 72 to point 73. In heating the distilland, the latent heat is utilized which is shown between points 72 and 73. It is, therefore, necessary to remove the superheat from the refrigerant vapor existing between points 71 and 72. This is achieved by the previously mentioned heat exchanger 53. The refrigerant liquid is then expanded between points 73 and 74 and the latent heat between points 74 and 70 is utilized to condense water vapor in the condensing chamber 3. It is desirable that a heat balance be achieved wherein the latent heat required to heat the distilland between points 72 and 73 be substantially equal to the latent heat to condense distilland vapor between points 74 and 70.

A situation may arise wherein insufficient heat is derived from the compressed vapor between points 71 and 73 to maintain a desired temperature at line 41 in FIGURE 1, and it is necessary to supplement the heat from the refrigeration circuit with heat such as electrical energy from heating element 14 located in heat exchanger 13. The attractiveness of the utilization of a refrigeration circuit with the distillation apparatus arises in the low temperature differences between the refrigerant vapor condensing temperature and the refrigerant evaporating temperature. This low temperature differential permits the achieving of a high coefficient of performance in the refrigeration circuit. The cycle in the refrigeration circuit is basically a Carnot cycle and the coefficient of performance is considered an expression of the efficiency of the cycle since it is the relationship between the output, that is, the refrigeration effect of the cycle and the energy input to the cycle.

In FIGURE 3, the actual COP (coefficient of performance) is plotted against $\Delta t$ which is the temperature differential in the refrigeration circuit. Curve 80 indicates that with low temperature differential, for example, a 10° differential may supply a coefficient of performance in the area of 17. With refrigeration circuits utilized in air conditioning apparatus wherein the $\Delta t$ is in the area of 80°, this coefficient of performance may be in the area of 3. In the present application, theoretically, the cooling effect should provide a high coefficient of performance since the heat of condensation is substantially equal to the heat of evaporation required and substantially the only work is the pumping effort by the compressor in circulating the refrigerant in the circuit.

Curve 77 in FIGURE 4 illustrates the COP (coefficient of performance) for the refrigeration circuit plotted against the power input to an appliance type water heater-softener. Line 78, which is parallel to the abscissa, illustrates theoretical heat pump input required in event that all the distilland supplied is evaporated. Line 79 which is parallel to the abscissa indicates the actual heat pump input required, taking into account that a substantial amount of distilland is discharged from the system to maintain a low concentration of the impurities in the distilland in sump 26.

In FIGURE 4, with a coefficient of performance less than 10, heat must be rejected from the cycle from line 79 to curve 77. This rejected heat is illustrated as $Q_{53}$ and is rejected in heat exchanger 53 shown in FIGURE 1. In the event that coefficient of performance is greater than approximately 10, curve 77 extends below line 79 and the heat pump input is inadequate to maintain the proper temperature in storage means 42, therefore, supplemental heat $Q_{13}$ is supplied by heat exchanger 13 to the distilland being passed to evaporating chamber 2.

The present invention recognizes that flash evaporation of distilland will substantially avoid scaling problems normally encountered in distillation apparatus. Furthermore, a refrigeration circuit is utilized to heat distilland and condense distillate. Since the temperature differential required between heating and condensing temperatures is small, a high coefficient of performance is achieved in the refrigeration circuit; this coefficient of performance being an expression of the efficiency of the cycle. The solving of scaling problems and the economical use of electrical energy makes the use of this type of apparatus feasible for home appliance use as a water demineralizing device. While the present invention is illustrated utilizing a vapor compression cycle, other refrigeration cycles, such as absorption cycles, may be used.

While I have described a preferred embodiment of the invention, it will be understood that the invention is not limited thereto since it may be otherwise embodied within the scope of the appended claims.

What I claim as new and desire to secure by Letters Patent of the United States is:

1. In an apparatus for water distillation the combination of
   a refrigeration circuit adapted to contain a refrigerant therein including
   a condenser and
   an evaporator,
   means for passing distilland into heat exchange relation with the condenser of the refrigeration circuit to heat the distilland,
   means defining a chamber,
   means for evacuating the chamber,
   means for spraying distilland into the chamber to evaporate the distilland,
   means for passing distillate vapor into heat exchange relation with the evaporator of the refrigeration circuit to condense the distillate vapor,
   a heating means, supplied with a heating medium from a source external to both the distillation apparatus and the refrigeration circuit, located downstream of the refrigeration condenser and upstream of the chamber, for increasing the temperature of the distilland and the temperature of the vapor formed within the chamber by bringing the distilland in heat exchange relationship with the heating medium to thereby raise the distillate temperature, and
   cooling means in said refrigeration circuit, downstream of the refrigeration evaporator and upstream of the refrigeration condenser, adapted to contain a cooling medium which is passed in heat exchange relationship with refrigerant within the refrigeration circuit, for decreasing the temperature of refrigerant and thereby the temperature of the distilland, said cooling means acting with the influence of said heating means to maintain a temperature differential between the condenser and evaporator of the refrigeration circuit at a value that results in maintenance of the desired temperature in said chamber and thus a high coefficient of performance for the refrigeration circuit, and a high efficiency for the distillation apparatus.

2. In an apparatus for water distillation the combination of
   a refrigeration circuit including
   a condenser and
   an evaporator,
   means for passing distilland into heat exchange relation with the condenser of the refrigeration circuit to heat the distilland,
   means defining a chamber,
   means for evacuating the chamber,
   means for spraying distilland into the chamber to evaporate the distilland,
   means for recirculating distilland through the spraying means,
   a first heat exchanger for adjusting the temperature of the incoming distilland and thereby aid in maintaining the temperature in said chamber,
   means for passing distillate vapor into heat exchange relation with the evaporator of the refrigeration circuit to condense the distillate vapor,
   a heating element having a heating medium passed therethrough positioned downstream of the refrigerant condenser and upstream of the chamber so that the heating medium can be passed in heat transfer relationship with the distilland to increase the temperature of distillate vapor emanating from the chamber and thereby the distillate in contact with the evaporator of the refrigeration circuit,
   means to supply a heating medium to said heating element from a source external to both the distillation apparatus and the refrigeration circuit, and
   a second heat exchanger through which a cooling medium passed during operation is located in said refrigeration circuit downstream of the evaporator and upstream of the condenser for decreasing the temperature of a refrigerant within the refrigeration circuit by passing the cooling medium in heat exchange relationship therewith to cool distilland in contact with the condenser of the refrigeration circuit and thereby, with the influence of said heating element, maintain the temperature differential between said condenser and said evaporator at a value that maintains the desired temperature in the chamber and that results in a high coefficient of performance for the refrigeration circuit and thereby a high efficiency for the distillation apparatus.

3. In an apparatus for water distillation the combination of
   a refrigeration circuit adapted to contain a refrigerant including
   a condenser and
   an evaporator,
   means for passing distilland into heat exchange relation with the condenser of the refrigeration circuit to heat the distilland,
   means defining a chamber,
   means for evacuating the chamber,
   means for spraying distilland into the chamber to evaporate the distilland,
   means for recirculating distilland through the spraying means,
   a first heat exchanger for adjusting the temperature of the incoming distilland to thereby aid in maintaining the temperature in said chamber,
   means for passing distillate vapor into heat exchange relation with the evaporator of the refrigeration circuit to condense the distillate vapor,
   a heating element positioned downstream of the refrigerant condenser and upstream of the chamber for passing a heating medium in heat transfer relationship with distalland passing into the spraying means from the refrigeration evaporator, which is adapted to increase the temperature of the distillate vapor emanating from the chamber and the distillate in contact with the evaporator of the refrigeration circuit to thereby increase the temperature within the evaporator, means to supply a heat exchange medium to said heating element from a source external to both the distillation apparatus and the refrigeration circuit, and a second heat exchanger, in said refrigeration circuit downstream of said evaporator and upstream of said condenser, for passing a cooling medium in heat transfer relationship with refrigerant in the refrigeration circuit to decrease the temperature of the refrigerant and of the distilland in contact with the condenser of the refrigeration circuit, and thereby with the influence of said heating element, maintain the temperature differential between said condenser and said evaporator at a value of approximately 20° F., a value that maintains the desired temperature in said chamber and that results in a high coefficient of performance for the refrigeration system and thereby results in a high efficiency of the distillation apparatus.

4. In a method of water demineralization the steps which comprise passing distilland into heat exchange relation with the condenser of a refrigeration system to heat the distilland, passing the distilland into an evacuated chamber to cause flash evaporation of the distilland, passing distillate vapor adjacent the evaporator of the refrigeration system to condense the distillate vapor, and controlling the temperature differential between the condenser and the evaporator of the refrigeration system by providing heating means located downstream of the evaporator and upstream of the evacuated chamber, which is supplied with a heat exchange medium from a source external to both the distillation apparatus and the refrigeration system, to heat the distilland by passing the heat exchange medium in heat transfer relationship therewith and thereby heat the distillate in contact with the evaporator of the refrigeration system, and cooling means in the form of a heat exchanger positioned in the refrigeration system downstream of the evaporator and upstream of the condenser so that a cooling medium passing through the cooling means will be in heat transfer relationship with a refrigerant flowing through the refrigeration system, to maintain the desired temperature in the chamber and maintain a high coefficient of performance in the refrigeration system and thereby a high efficiency of the distillation process.

5. In a method of water demineralization the steps which comprise passing distilland into heat exchange relation with a condenser of a refrigeration circuit to heat the distilland, passing the distilland through a heating means which is adapted to heat the distilland as it passes between the condenser and an evacuated chamber, by passing the distilland in heat exchange relationship with a heating medium also passing through the heating means, the heating medium is supplied from a source external to both the distillation apparatus and the refrigeration circuit, passing the distilland into an evacuated chamber to cause flash evaporation of the distilland, recirculating a portion of the distillate into the evacuated chamber, passing distillate vapor adjacent the evaporator of the refrigeration circuit to condense the distillate vapor, and adjusting the temperature differential between the condenser and the evaporator of the refrigeration circuit by supplying heat from the heating means and cooling from a heat exchanger in the refrigeration circuit, located downstream of the evaporator and upstream of the condenser, through which a cooling medium is also passed in heat exchange relationship with refrigerant within the refrigeration circuit to maintain the desired temperature in the chamber and maintain a high coefficient of performance in the refrigeration circuit and thereby a high efficiency of the distillation process.

References Cited by the Examiner

UNITED STATES PATENTS 2,018,049 10/1935 Allen _____ 202—46 X
2,441,361 5/1948 Kirgan _____ 202—75

FOREIGN PATENTS 174,955 2/1922 Great Britain.

OTHER REFERENCES

Germany, K24,930, December 1956.

NORMAN YUDKOFF, *Primary Examiner.*